Patented June 19, 1934

1,963,909

UNITED STATES PATENT OFFICE 1,963,909

PROCESS FOR CONVERTING SCRAP LEATHER INTO A FERTILIZER COMPONENT

Walter Hoge MacIntire and Guy Alexander Shuey, Knoxville, Tenn., assignors to Knoxville Glove Company, Knoxville, Tenn., a corporation of Tennessee No Drawing. Application December 23, 1933, Serial No. 703,834

7 Claims. (Cl. 71—6)

This invention relates to a process for converting waste leather into a fertilizer component and the object of which is the conversion of the waste leather, chrome or vegetable-tanned leather, or a mixture thereof, into a product in which the nitrogenous content is made available, when mixed with soil, to plants during the entire growing season since the nitrogen is so combined as to maintain a prolonged availability and is not readily affected by the solvent action of water as to be immediately lost from the soil.

The suitability, however, will be based upon two factors, a mechanical condition that would be suitable and a chemical make-up that would result in a preferable state of solubility.

As is well known, leather is rich in nitrogenous matter, but the nitrogen content of the several waste leather materials is in such chemical combinations as to preclude a ready availability of the nitrogen as a source of plant food. Formerly, it was possible to include waste leather in nitrogenous mixed fertilizers and credit was given for the nitrogen content that was supplied by the leather, although the use of the fertilizer obtained no benefits from the leather component, because of the inactivity of the leather after its incorporation with the soil. The methods of analysis that call for the digestion of the mixed fertilizer converted the inactive leather contents into ammonium sulphate, and hence the analysis showed a nitrogen value in excess of true. Subsequently provision was made for microscopic examinations in order to preclude the unwarranted evaluation of included unprocessed leather scrap. Since that step was taken, it has been necessary to process waste or scrap leather intended for use in fertilizer, and methods of control have been devised whereby chemical analysis will indicate the degree of availability. As a natural result different processes have been advanced for the prior treatment of leather and similar waste materials.

The process herein set forth is one in which waste leather is subjected to hydrolytic changes, thus converting the nitrogen to a form or forms readily assimilated by plants.

The process may be stated as follows:

A quantity of waste leather, chrome or vegetable-tanned, or mixtures thereof together with an equal weight of approximately 0.5% of a mineral acid preferably sulfuric, is charged into an autoclave or another suitable type of pressure-heating tank. It is preferable that the dilute acid be added simultaneously with the leather, or that the dilute acid be poured upon the charge of leather, although an amount of water equal to the weight of leather used may be added followed by the introduction of an amount of concentrated sulfuric acid sufficient to make a 0.5% solution of $H_2SO_4$. It is important in the practice of the process to have the charge consist of equal, or approximately equal quantities by weight of leather and 0.5% sulfuric acid. The cooker or autoclave is closed, and its contents are heated by a steam pressure until thirty (30) pounds gauge pressure is registered, producing a temperature of approximately 130° C. (266° F.) and these conditions are maintained for a period of ninety (90) minutes. The residues from the original leather will either retain the same distinctive forms and shapes as the original pieces of leather, or the vegetable-tanned leather will be reduced to a mass—a "gummy" condition or plastic state, while hot. Upon cooling, or cooling and drying, both types of material dry very readily and are distinctly brittle and therefore in a state well adapted to comminution. This effect is in contradistinction to that characteristic of other processes that give a gelatinous, water-retaining, product. The processed material may be dried by any of the convenient methods and devices used for this purpose.

The excess of the dilute acid liquor is drained off from the autoclave or cooker. The drained liquor is then cooled and separated from its oily fraction. The acid fraction may then be used as a part of the succeeding 0.5% acid treatment, and after the accumulation resultant from several such usages the acid liquor may be neutralized with an injection of ammonia ($NH_3$) chemically equivalent to the acid present, and its dissolved content recovered by evaporation, the material so recovered being principally water-soluble nitrogenous matter and ammonium sulphate.

The processed material, as it comes from the autoclave, is very slightly acid and it is preferable that it be left in this state, although for some purposes it is altogether feasible and permissible to kill off the small amount of absorbed and retained sulfuric acid by an injection of ammonia gas.

The product so formed is excellent material for use as a component of mixed fertilizers. The fertilizing value of the product obtained from the process described can be gauged by the fact that 80 to 85% of the total content of nitrogen is in the partially hydrolyzed state, or condition in which nitrogen is not so soluble in water as to be quickly lost from the soil; nevertheless, when mixed with soil, the processed material readily decomposes and supplies the plant with nitrogen throughout the entire growing season, although from 15% to 20% of the total nitrogen of the product is water-soluble, and hence immediately available to the plant during its incipient stage of growth. It is recognized that there are other processes whereby leather scrap is treated chemically to produce a somewhat similar product, but we claim for the product made by this process, the important feature of partial hydrolysis, which assures a high and prolonged availability, as distinguished from excessive and immediate water-solubility.

One of the characteristic advantages of this process is the hydrolytic effect produced to a maximal degree without any extensive and concomitant transformation of any tannic acid content, the primary result being the production of a hydrolyzed product that is resistant to direct solvent action of water, but at the same time a product readily susceptible to transformations induced by biological agencies in the soil.

Another characteristic advantage of this process is the production of a material that serves to condition a mixed or "complete" fertilizer and to minimize the undesirable tendency of such mixed fertilizers to become "caked".

Having thus fully described our said invention, what we claim as new and desire to secure by Letters Patent, is:

1. The process of converting waste leather into a nitrogenous and conditioning component for fertilizer, which comprises treating the waste leather with sulfuric acid not exceeding a .5% solution in the presence of steam under gauge pressure of approximately 30 pounds per square inch, maintaining this condition for a period of approximately 90 minutes, cooling the resultant product to dry condition and pulverizing the same.

2. The process of converting waste leather into a form in which the nitrogen is made available for plant food, which comprises treating a quantity by weight of waste leather with an equal weight of .5% solution of sulfuric acid in the presence of steam under pressure at a temperature of approximately 130° C., maintaining said temperature for a desired interval, cooling the resultant product and drying the same.

3. The process of converting scrap leather into a nitrogenous and conditioning component for fertilizer which comprises subjecting a quantity by weight of scrap leather with an equal quantity by weight of .5% solution of a mineral acid in the presence of steam under a pressure of approximately 30 pounds per square inch for a desired interval, cooling the resultant product and drying the same, after removing the excess liquid.

4. The process of converting scrap leather into a nitrogenous and conditioning component for fertilizer, which comprises subjecting the scrap leather in the presence of steam under pressure to the hydrolyzing effect of a solution of sulfuric acid not exceeding a .5% solution.

5. The process of converting scrap leather into a nitrogenous and conditioning component for fertilizer, which comprises treating an equal weight of scrap leather in the presence of steam under pressure of approximately 30 pounds per square inch to the hydrolyzing action of an equal weight of a .5% solution of sulfuric acid.

6. The method of converting scrap leather into a conditioning and nitrogenous component for fertilizer, which comprises treating an equal quantity by weight of scrap leather and .5% solution of sulfuric acid in the presence of steam under a pressure of approximately 30 pounds for a period of at least one and one-half hours, removing the residue liquor, cooling the resultant product, drying and comminuting the same.

7. The method of converting scrap leather into a nitrogenous and conditioning fertilizer component of a preferred solubility which comprises treating scrap leather with a .5% solution of sulfuric acid in the presence of steam of approximately 30 pounds per square inch for a period of approximately 90 minutes to render the scrap leather in such a state as to be resistant to the direct solvent action of water, yet readily decomposable by the biological agencies in the soil, thus supplying nitrogen to growing plants.

WALTER HOGE MacINTIRE.
GUY ALEXANDER SHUEY.